(12) United States Patent
Candelore et al.

(10) Patent No.: US 9,202,212 B1
(45) Date of Patent: Dec. 1, 2015

(54) USING MOBILE DEVICE TO MONITOR FOR ELECTRONIC BANK CARD COMMUNICATION

(71) Applicant: SONY CORPORATION, Tokyo (JP)

(72) Inventors: Brant Candelore, San Diego, CA (US); Steven Martin Richman, San Diego, CA (US); Frederick J. Zustak, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/493,650

(22) Filed: Sep. 23, 2014

(51) Int. Cl.
*G06K 19/06* (2006.01)
*G06Q 20/32* (2012.01)
*G06Q 20/34* (2012.01)

(52) U.S. Cl.
CPC ........ *G06Q 20/3227* (2013.01); *G06Q 20/3278* (2013.01); *G06Q 20/356* (2013.01)

(58) Field of Classification Search
CPC ...... H04B 5/0031; H04B 5/02; H04B 5/0062; H04B 1/385; H04B 2001/3861; H04B 5/0025; H04B 5/0037; H04B 5/0056; H04B 5/0075; G06F 21/35; G06F 17/30867; G06F 19/327; G06F 21/32; G06F 3/048
USPC .................................. 235/492, 380, 375, 379
See application file for complete search history.

(56) References Cited

U.S. PATENT DOCUMENTS

| | | |
|---|---|---|
| 4,643,455 A | 2/1987 | North et al. |
| 5,036,461 A | 7/1991 | Elliott et al. |
| 5,097,115 A | 3/1992 | Ogasawara et al. |
| 5,217,056 A | 6/1993 | Ritter |
| 5,241,600 A | 8/1993 | Hillis |
| D339,807 S | 9/1993 | Tattari et al. |
| 5,673,309 A | 9/1997 | Woynoski et al. |
| 5,987,325 A | 11/1999 | Tayloe |
| 6,105,006 A | 8/2000 | Davis et al. |
| 6,119,934 A | 9/2000 | Kolls |
| 6,169,974 B1 | 1/2001 | Baumgartner |
| D441,733 S | 5/2001 | Do et al. |
| 6,233,316 B1 | 5/2001 | Schier et al. |
| 6,278,885 B1 | 8/2001 | Hubbe et al. |
| 6,370,240 B1 | 4/2002 | Woynoski et al. |
| 6,400,965 B1 | 6/2002 | Phillips et al. |
| 6,424,118 B1 | 7/2002 | Tu |
| 6,424,639 B1 | 7/2002 | Lioy et al. |
| 6,434,405 B1 | 8/2002 | Sashihara |
| 6,601,762 B2 | 8/2003 | Piotrowski |
| 6,650,888 B1 | 11/2003 | Cook |
| 6,697,472 B1 | 2/2004 | Jordan et al. |
| 6,700,963 B1 | 3/2004 | Jordan |
| 6,991,159 B2 | 1/2006 | Zenou |

(Continued)

OTHER PUBLICATIONS

Brant Candelore, Steven M. Richman, Frederick J. Zustak, "Messaging Customer Mobile Device when Electronic Bank Card Used", file history of related pending U.S. Appl. No. 14/493,683, filed Sep. 23, 2014.

(Continued)

*Primary Examiner* — Thien M Le
(74) *Attorney, Agent, or Firm* — John L. Rogitz

(57) ABSTRACT

A bank customer's CE device passively eavesdrops on NFC communications between the customer's electronic debit or credit card ("e-card") and a third device and alerts the customer when such communication is detected from the e-card. In this way, the customer is alerted to possibly fraudulent "fishing" of the e-card data by a nearby thief device.

15 Claims, 14 Drawing Sheets

(56) References Cited

U.S. PATENT DOCUMENTS

| | | |
|---|---|---|
| 7,054,627 B1 | 5/2006 | Hillman |
| 7,054,660 B2 | 5/2006 | Lord |
| 7,212,806 B2 | 5/2007 | Karaoguz |
| 7,248,896 B2 | 7/2007 | Luo |
| 7,254,548 B1 * | 8/2007 | Tannenbaum ............... 705/18 |
| 7,286,813 B1 | 10/2007 | Cook |
| 7,305,249 B2 | 12/2007 | Lo |
| 7,310,414 B2 | 12/2007 | Carvelli et al. |
| 7,341,182 B2 | 3/2008 | Lai et al. |
| 7,357,310 B2 | 4/2008 | Calabrese et al. |
| 7,418,267 B2 | 8/2008 | Karaoguz |
| 7,499,888 B1 | 3/2009 | Tu et al. |
| 7,512,567 B2 | 3/2009 | Bemmel et al. |
| 7,543,156 B2 | 6/2009 | Campisi |
| 7,574,733 B2 | 8/2009 | Woodhill |
| 7,828,214 B2 | 11/2010 | Narendra et al. |
| 7,861,077 B1 | 12/2010 | Gallagher, III |
| 7,894,634 B2 | 2/2011 | Chung |
| 7,904,360 B2 | 3/2011 | Evans |
| 7,930,554 B2 | 4/2011 | Coulier et al. |
| 7,954,706 B2 | 6/2011 | Calabrese et al. |
| 7,980,464 B1 | 7/2011 | Sarris et al. |
| 8,005,509 B2 | 8/2011 | Huang et al. |
| 8,036,967 B2 | 10/2011 | Adams |
| 8,095,965 B2 | 1/2012 | Lennie et al. |
| 8,145,561 B1 | 3/2012 | Zhu |
| 8,213,906 B2 | 7/2012 | Chen |
| 8,245,044 B2 | 8/2012 | Kang |
| 8,325,889 B2 | 12/2012 | Bilstad et al. |
| 8,374,324 B2 | 2/2013 | Suryanarayana et al. |
| 8,386,386 B1 | 2/2013 | Zhu |
| 8,447,272 B2 | 5/2013 | Faith et al. |
| 8,485,442 B2 | 7/2013 | McNeal |
| 8,549,594 B2 | 10/2013 | Lin |
| 8,576,997 B2 | 11/2013 | Suryanarayana et al. |
| 8,577,336 B2 | 11/2013 | Mechaley, Jr. |
| 8,615,437 B2 | 12/2013 | Yoo |
| 8,620,754 B2 | 12/2013 | Fisher |
| 8,700,457 B2 | 4/2014 | Craft |
| 8,719,905 B2 | 5/2014 | Ganesan |
| 8,730,872 B2 | 5/2014 | Elmaleh |
| 8,733,663 B2 | 5/2014 | Hammad et al. |
| 8,751,315 B2 | 6/2014 | Fisher |
| 8,751,316 B1 | 6/2014 | Fletchall et al. |
| 2002/0035542 A1 | 3/2002 | Tumey et al. |
| 2002/0099664 A1 | 7/2002 | Cohen |
| 2002/0152178 A1 | 10/2002 | Lee |
| 2002/0190124 A1 | 12/2002 | Piotrowski |
| 2004/0019564 A1 | 1/2004 | Goldthwaite et al. |
| 2004/0064406 A1 | 4/2004 | Yates et al. |
| 2004/0068448 A1 | 4/2004 | Kim |
| 2004/0078340 A1 | 4/2004 | Evans |
| 2004/0101112 A1 | 5/2004 | Kuo |
| 2004/0254894 A1 | 12/2004 | Tsuei et al. |
| 2005/0041862 A1 | 2/2005 | Lo |
| 2005/0070330 A1 | 3/2005 | Nicolas et al. |
| 2005/0071671 A1 | 3/2005 | Karaoguz |
| 2005/0165674 A1 | 7/2005 | Edwards et al. |
| 2005/0224573 A1 | 10/2005 | Yoshizane et al. |
| 2005/0232471 A1 | 10/2005 | Baer |
| 2006/0202025 A1 | 9/2006 | Calabrese et al. |
| 2006/0212407 A1 | 9/2006 | Lyon |
| 2006/0235796 A1 | 10/2006 | Johnson et al. |
| 2006/0253389 A1 * | 11/2006 | Hagale et al. ............... 705/39 |
| 2006/0285659 A1 | 12/2006 | Suryanarayana et al. |
| 2007/0007334 A1 | 1/2007 | Wong |
| 2007/0094152 A1 | 4/2007 | Bauman et al. |
| 2007/0106564 A1 | 5/2007 | Matotek et al. |
| 2007/0108269 A1 | 5/2007 | Benco et al. |
| 2007/0138261 A1 | 6/2007 | Flinchem |
| 2007/0145121 A1 | 6/2007 | Dallal et al. |
| 2007/0174904 A1 | 7/2007 | Park |
| 2007/0236467 A1 | 10/2007 | Marshall et al. |
| 2007/0239614 A1 * | 10/2007 | Tannenbaum et al. ........ 705/53 |
| 2007/0245158 A1 | 10/2007 | Giobbi et al. |
| 2008/0005575 A1 | 1/2008 | Choyi et al. |
| 2008/0046366 A1 | 2/2008 | Bemmel et al. |
| 2008/0097851 A1 | 4/2008 | Bemmel et al. |
| 2008/0126260 A1 | 5/2008 | Cox et al. |
| 2008/0154760 A1 | 6/2008 | Calabrese et al. |
| 2008/0245851 A1 | 10/2008 | Kowalski |
| 2009/0048916 A1 | 2/2009 | Nuzum et al. |
| 2009/0049534 A1 | 2/2009 | Chung |
| 2009/0106138 A1 | 4/2009 | Smith et al. |
| 2009/0157549 A1 | 6/2009 | Symons |
| 2009/0239512 A1 | 9/2009 | Hammad et al. |
| 2009/0307140 A1 | 12/2009 | Mardikar |
| 2009/0313129 A1 | 12/2009 | Rothschild |
| 2010/0008535 A1 | 1/2010 | Abulafia et al. |
| 2010/0012721 A1 * | 1/2010 | Jain et al. .................. 235/380 |
| 2010/0029249 A1 | 2/2010 | Bilstad et al. |
| 2010/0030592 A1 | 2/2010 | Evans et al. |
| 2010/0030651 A1 | 2/2010 | Matotek et al. |
| 2010/0030689 A1 | 2/2010 | Ramos et al. |
| 2010/0044444 A1 * | 2/2010 | Jain et al. .................. 235/492 |
| 2010/0099380 A1 | 4/2010 | Chen |
| 2010/0125737 A1 | 5/2010 | Kang |
| 2010/0161433 A1 | 6/2010 | White |
| 2010/0199086 A1 | 8/2010 | Kuang et al. |
| 2011/0000961 A1 | 1/2011 | McNeal |
| 2011/0072499 A1 | 3/2011 | Lin |
| 2011/0159850 A1 | 6/2011 | Faith et al. |
| 2011/0165836 A1 | 7/2011 | Dixon et al. |
| 2011/0196792 A1 | 8/2011 | Calabrese et al. |
| 2011/0250839 A1 | 10/2011 | Lee |
| 2011/0263292 A1 | 10/2011 | Phillips |
| 2011/0265149 A1 | 10/2011 | Ganesan |
| 2012/0071088 A1 | 3/2012 | Cordier |
| 2012/0071090 A1 | 3/2012 | Charrat et al. |
| 2012/0078751 A1 | 3/2012 | MacPhail et al. |
| 2012/0084132 A1 * | 4/2012 | Khan ...................... 705/14.26 |
| 2012/0129492 A1 | 5/2012 | Mechaley, Jr. |
| 2012/0178366 A1 | 7/2012 | Levy et al. |
| 2012/0195295 A1 | 8/2012 | Elmaleh |
| 2012/0197743 A1 | 8/2012 | Grigg et al. |
| 2012/0226565 A1 | 9/2012 | Drozd |
| 2012/0271692 A1 | 10/2012 | Huang et al. |
| 2012/0290421 A1 | 11/2012 | Qawami et al. |
| 2012/0290449 A1 * | 11/2012 | Mullen et al. .............. 705/27.2 |
| 2012/0330769 A1 | 12/2012 | Arceo |
| 2012/0330844 A1 * | 12/2012 | Kaufman ..................... 705/67 |
| 2013/0026229 A1 | 1/2013 | Jarman et al. |
| 2013/0035035 A1 | 2/2013 | Fisher |
| 2013/0046635 A1 | 2/2013 | Gridd et al. |
| 2013/0046645 A1 | 2/2013 | Grigg et al. |
| 2013/0069431 A1 | 3/2013 | Tseng |
| 2013/0084831 A1 | 4/2013 | Suryanarayana et al. |
| 2013/0097036 A1 | 4/2013 | Fisher |
| 2013/0103510 A1 * | 4/2013 | Tilles ........................... 705/17 |
| 2013/0115935 A1 | 5/2013 | Boehler |
| 2013/0171929 A1 | 7/2013 | Adams et al. |
| 2013/0173403 A1 | 7/2013 | Grigg et al. |
| 2013/0173405 A1 | 7/2013 | Gouessant |
| 2013/0191232 A1 | 7/2013 | Calman et al. |
| 2013/0200146 A1 | 8/2013 | Moghadam |
| 2013/0211930 A1 | 8/2013 | Yoo |
| 2013/0211933 A1 | 8/2013 | Yoo |
| 2013/0212007 A1 | 8/2013 | Mattsson et al. |
| 2013/0226792 A1 * | 8/2013 | Kushevsky et al. ............ 705/41 |
| 2013/0227286 A1 | 8/2013 | Brisson |
| 2013/0297507 A1 | 11/2013 | Mechaley, Jr. |
| 2013/0346223 A1 | 12/2013 | Prabhu et al. |
| 2013/0346224 A1 | 12/2013 | Yoo |
| 2014/0013406 A1 | 1/2014 | Tremlet |
| 2014/0018110 A1 | 1/2014 | Yaokum |
| 2014/0025579 A1 * | 1/2014 | Nilsson ......................... 705/44 |
| 2014/0025583 A1 | 1/2014 | McNeal |
| 2014/0032345 A1 | 1/2014 | Moore |
| 2014/0038571 A1 | 2/2014 | Pan et al. |
| 2014/0040136 A1 | 2/2014 | Gatlin |
| 2014/0046844 A1 | 2/2014 | Grigg |
| 2014/0052638 A1 | 2/2014 | Chung et al. |
| 2014/0058865 A1 | 2/2014 | Yang et al. |
| 2014/0090952 A1 | 4/2014 | Johnson et al. |

(56) References Cited

U.S. PATENT DOCUMENTS

| | | | |
|---|---|---|---|
| 2014/0096201 A1* | 4/2014 | Gupta | 726/4 |
| 2014/0114776 A1 | 4/2014 | Solanki et al. | |
| 2014/0138435 A1 | 5/2014 | Khalid | |
| 2014/0162598 A1* | 6/2014 | Villa-Real | 455/411 |
| 2014/0180777 A1 | 6/2014 | Moshrefi et al. | |
| 2014/0365782 A1 | 12/2014 | Beatson et al. | |
| 2015/0002296 A1* | 1/2015 | Bell | 340/540 |
| 2015/0004934 A1* | 1/2015 | Qian et al. | 455/411 |
| 2015/0006390 A1* | 1/2015 | Aissi et al. | 705/44 |
| 2015/0025918 A1* | 1/2015 | Sherman | 705/5 |
| 2015/0039455 A1* | 2/2015 | Luciani | 705/17 |
| 2015/0046323 A1* | 2/2015 | Blythe | 705/41 |
| 2015/0058220 A1* | 2/2015 | Cazanas et al. | 705/44 |
| 2015/0095224 A1* | 4/2015 | Blythe | 705/41 |

OTHER PUBLICATIONS

Brant Candelore, Steven M. Richman, Frederick J. Zustak, "Receiving Fingerprint Through Touch Screen on CE Device", file history of related pending U.S. Appl. No. 14/493,717, filed Sep. 23, 2014.

Brant Candelore, Steven M. Richman, Frederick J. Zustak, "Using Biometrics to Recover Password in Customer Mobile Device", file history of related pending U.S. Appl. No. 14/493,741, filed Sep. 23, 2014.

Brant Candelore, Steven M. Richman, Frederick J. Zustak, "Limiting E-Card Transactions Based on Lack of Proximity to Associated CE Device", file history of related pending U.S. Appl. No. 14/493,779, filed Sep. 23, 2014.

Brant Candelore, Steven M. Richman, Frederick J. Zustak, "Automatic Notification of Transaction by Bank Card to Customer Device", file history of related pending U.S. Appl. No. 14/493,825, filed Sep. 23, 2014.

Brant Candelore, Steven M. Richman, Frederick J. Zustak, "Customer's CE Device Interrogating Customer's E-Card for Transaction Information", file history of related pending U.S. Appl. No. 14/493,867, filed Sep. 23, 2014.

Brant Candelore, Steven M. Richman, Frederick J. Zustak, "E-Card Transaction Authorization Based on Geographic Location", file history of related pending U.S. Appl. No. 14/493,911, filed Sep. 23, 2014.

Brant Candelore, Steven M. Richman, Frederick J. Zustak, "Using CE Device Record of E-Card Transaction to Reconcile Bank Record", file history of related pending U.S. Appl. No. 14/493,958, filed Sep. 23, 2014.

Brant Candelore, Steven M. Richman, Frederick J. Zustak, "Analyzing Hack Attempts of E-Cards", file history of related pending U.S. Appl. No. 14/494,006, filed Sep. 23, 2014.

Brant Candelore, Steven Martin Richman, Frederick J. Zustak, "Receiving Fingerprints Through Touch Screen of CE Device", related U.S. Appl. No. 14/493,717, Non-Final Office Action dated Jun. 12, 2015.

Brant Candelore, Steven M. Richman, Frederick J. Zustak, "Receiving Fingerprints Through Touch Screen of CE Device", related U.S. Appl. No. 14/493,717, Applicant's response to Non-Final Office Action filed Jun. 17, 2015.

* cited by examiner

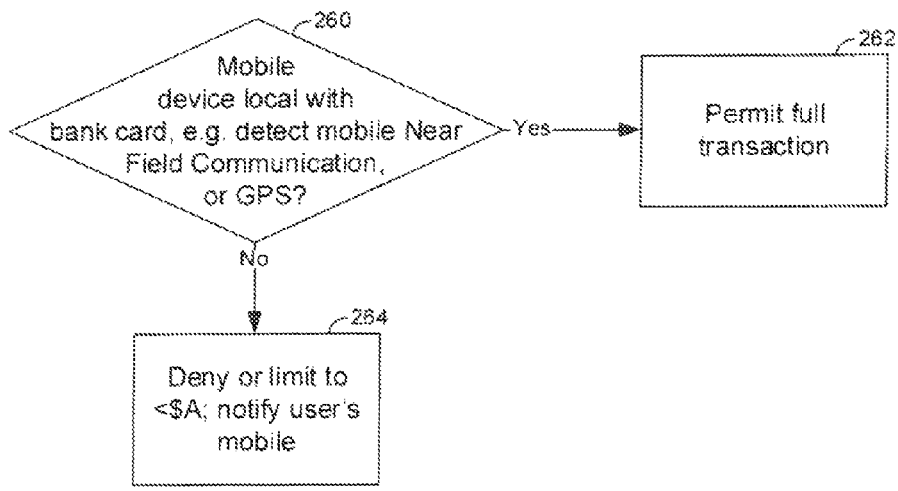
FIG. 16
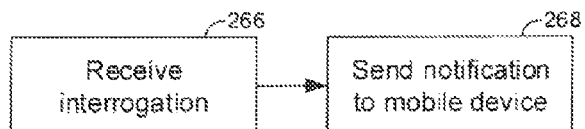
FIG. 17 (bank card)
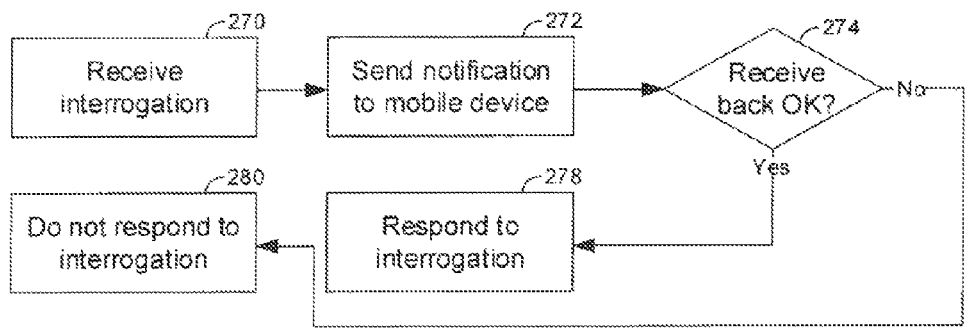
FIG. 17A

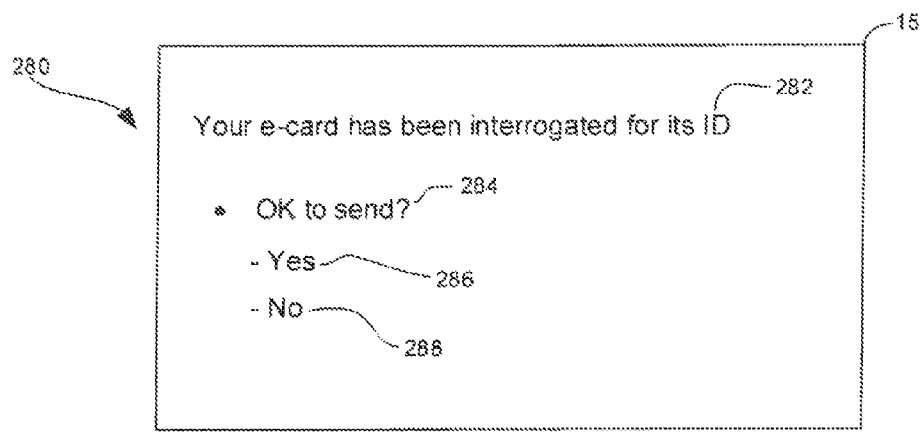
FIG. 18
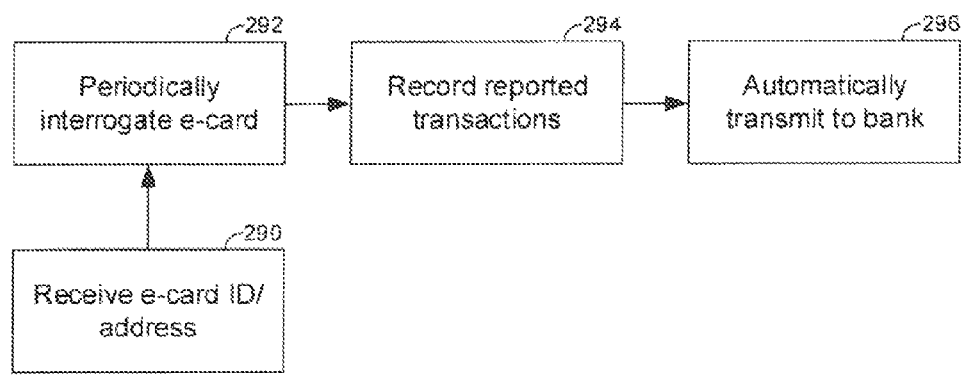
FIG. 19 (mobile)

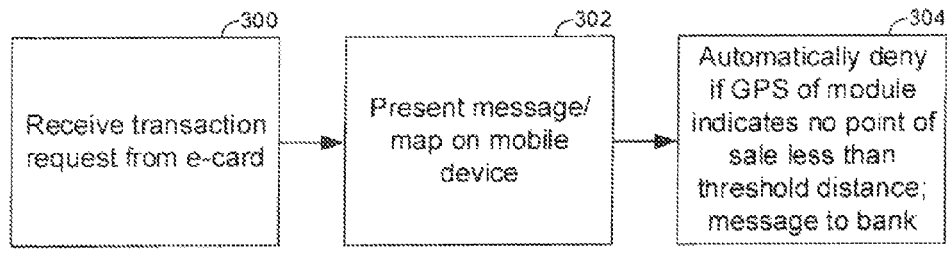
FIG. 20 (mobile)
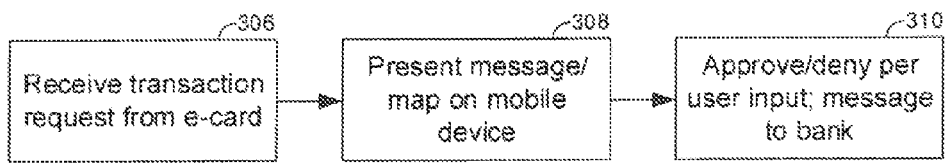
FIG. 21
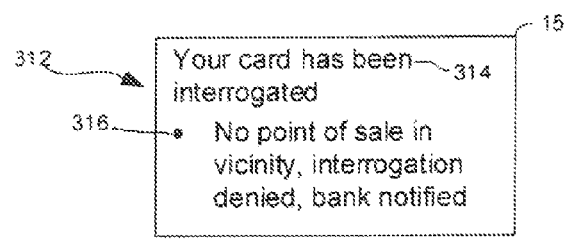
FIG. 22
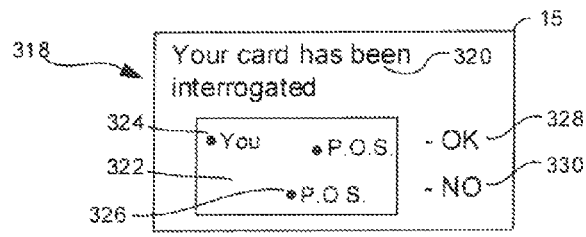
FIG. 23

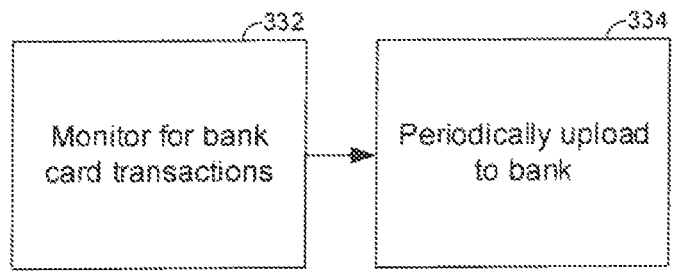
FIG. 24 (mobile)
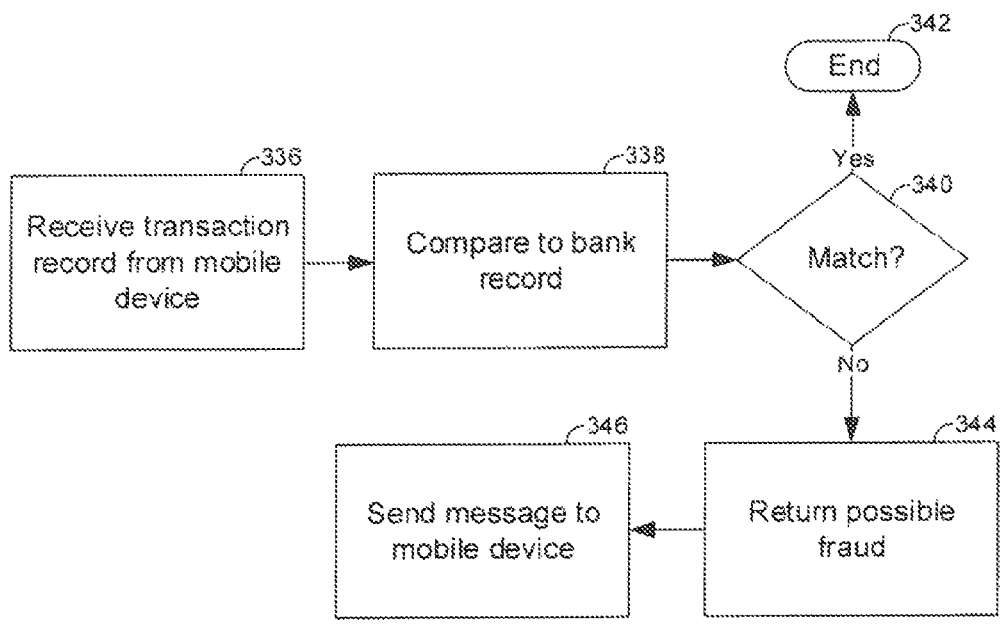
FIG. 25 (bank)

USING MOBILE DEVICE TO MONITOR FOR ELECTRONIC BANK CARD COMMUNICATION

FIELD OF THE INVENTION

The application relates generally to using mobile computing devices to monitor for electronic bank card communications.

BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

Present principles are directed to specific aspects of computer ecosystems, specifically, ecosystems that include electronic bank cards such as electronic debit and credit cards. Such cards typically communicate with other terminals such as a bank kiosk by responding to an interrogation from the kiosk using wireless near field communication (NFC) with identification and/or authentication data, to permit a monetary transaction or for other purposes, e.g., access into a controlled area.

SUMMARY OF THE INVENTION

As understood herein, it is possible for a hacker or other unauthorized person to transact with an electronic NFC card without the owner of the card being aware of this occurrence. The situation is so severe that a customer may be able to renege on subsequent purchases by hackers using purloined information from electronic cards by being able to state, accurately enough, that these were "ghost purchases".

Accordingly, a CE device includes at least one processor, at least one output device configured for being controlled by the processor, and at least one near field communication (NFC) receiver configured to provide input to the processor. At least one computer readable storage medium includes instructions which when executed by the processor configure the processor to receive input signals from the NFC receiver, and responsive to at least some of the input signals, present a user-perceptible alert on the output device.

In some embodiments the instructions when executed by the processor configure the processor to retrieve at least one identification (ID) from the signals from the NFC receiver, and compare the ID to at least one test ID, the test ID being an ID of an electronic transaction card (e-card). Responsive to the ID matching the test ID, the processor presents the user-perceptible alert, and responsive to the ID not matching the test ID, the processor does not present the user-perceptible alert.

The CE device can be implemented by a wireless telephone. The NFC receiver can be a radiofrequency identification (RFID) receiver.

In examples, the instructions when executed by the processor configure the processor to receive at least one test ID, with the test ID being a same ID as the ID of the e-card, the e-card being correlated to a customer associated with the CE device. The test ID can be received from a financial institution. The instructions when executed by the processor may configure the processor to, responsive to receiving the signals from the NFC receiver, transmit a wireless signal to a financial institution indicating reception of the signal from the NFC receiver by the CE device.

In another aspect, a system includes a bank customer's CE device configured for passively eavesdropping on near field communications (NFC) between the customer's electronic debit or credit card ("e-card") and a third device and alerting the customer when NFC is detected from the e-card to alert the customer to possibly fraudulent "fishing" of the e-card data by a thief device.

In another aspect, a non-transitory computer readable storage medium (NTCRSM) includes instructions executable by a processor to configure the processor to receive input signals from an NFC receiver, and responsive to at least some of the input signals, present a user-perceptible alert on an output device. The input signals are from an electronic transaction card (e-card).

The details of the present invention, both as to its structure and operation, can be best understood in reference to the accompanying drawings, in which like reference numerals refer to like parts, and in which:

BRIEF DESCRIPTION OF THE DRAWINGS

FIG. 16 is a flow chart of example logic for permitting e-card transactions based on geographic location;

FIGS. 17 and 17A are flow charts of example alternate e-card logic for notifying a CE device of an interrogation;

FIG. 18 is a screen shot of an example CE device UI related to FIGS. 17 and 17A;

FIG. 19 is a flow chart of example CE device logic for actively interrogating an e-card for purposes of monitoring and reporting e-card transactions;

FIGS. 20 and 21 are flow charts of example CE device logic for permitting e-card transactions based on point of sale location information;

FIGS. 22 and 23 are screen shots of example CE device UIs related to FIGS. 20 and 21; and FIGS. 24 and 25 are flow charts of example CE device logic and bank logic, respectively, that cooperate to compare CE device transaction records with bank transaction records.

DETAILED DESCRIPTION

Figure 1:
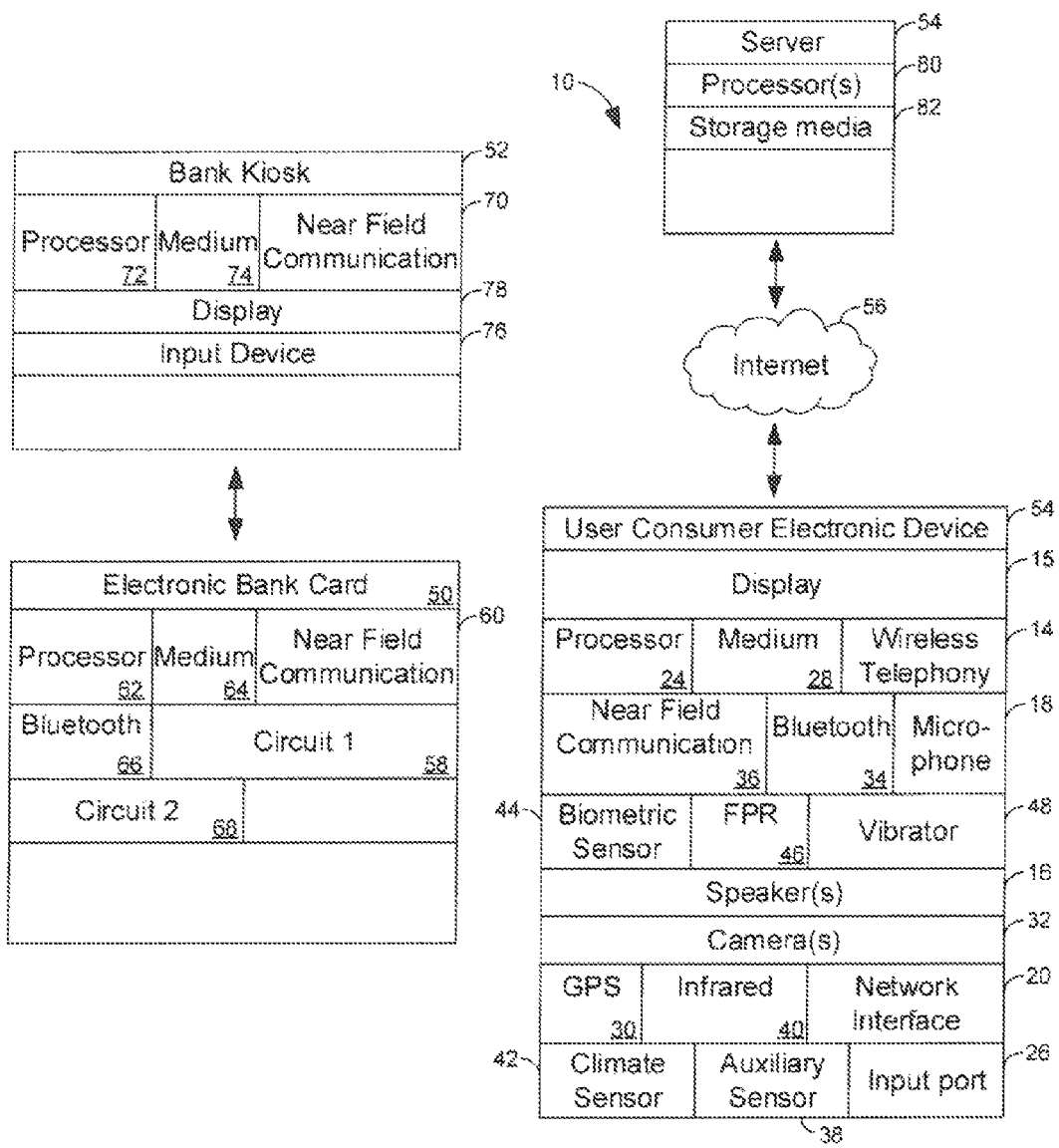
FIG. 1 is a block diagram of an example system including an example in accordance with present principles.

This disclosure relates generally to computer ecosystems and in particular to computer ecosystems that employ electronic cards for monetary transaction, access control, etc. A system herein may include server and client components connected over a network such that data may be exchanged between the client and server components, although some systems may not include servers. The system devices may include one or more computing devices including portable televisions (e.g. smart TV's, Internet-enabled TVs), portable computers such as laptops and tablet computers, and other mobile devices including smart phones, and additional examples discussed below. These devices may operate with a variety of operating environments. For example, some of the devices may employ, as examples, operating systems from Microsoft, or a Unix operating system, or operating systems produced by Apple Computer or Google.

Computing devices, however implemented, may include one or more processors executing instructions that configure the device to receive and transmit data over a network such as a wireless network. A device such as a server may be instantiated by a game console such as a Sony Playstation (trademarked), a personal computer, etc.

Information may be exchanged over a network between network devices. To this end and for security, devices can include firewalls, load balancers, temporary storages, and proxies, and other network infrastructure for reliability and security. One or more devices may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stared to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio. Note that a non-transitory computer readable storage medium explicitly includes hardware such as flash memory which may lose data upon loss of power.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example computer ecosystem 10 is shown, which may include one or more of the example devices mentioned above and described further below in accordance with present principles.

Each computing device typically is associated with a unique identification such as a media access control (MAC) address, and the MAC address may be correlated within the device (e.g., at time of manufacture or by a user at time of association with a particular component) or within a network server receiving information from the device with an identification of the component with which the MAC address is associated.

FIG. 1 shows that an example consumer electronics (CE) device 12 can be provided. Preferably, the CE device 12 is a mobile computing device such as a smart phone, although as described herein other devices may be used. When implemented as smart phone, the CE device 12 includes one or more wireless telephony transceivers 14 that may confirm to standards such as but not limited to Mobilex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX"), orthogonal frequency division multiplexing (OFDM).

The example CE device 12 may (but not must) include one or more displays 15 that may be implemented by a high definition or ultra-high definition "4K" or higher flat screen and that may be touch-enabled for receiving user input signals via touches on the display. The CE device 12 may include one or more speakers 16 for outputting audio in accordance with present principles, and at least one additional input device 18 such as e.g. an audio receiver/microphone for e.g. entering audible commands to the CE device 12 to control the CE device 12. The example CE device 12 may also include one or more network interfaces 20 for communication over at least one network under control of one or more processors 24. Thus, the interface 20 may be, without limitation, a Wi-Fi transceiver, which is an example of a wireless computer network interface. It is to be understood that the processor 24 controls the CE device 12 to undertake present principles, including the other elements of the CE device 12 described herein such as e.g. controlling the display 15 to present images therein and receiving input therefrom. Furthermore, note the network interlace 20 may be, e.g., a wired or wireless modem or router, or other appropriate interface such as, e.g., a wireless telephony transceiver, or Wi-Fi transceiver as mentioned above, etc.

In addition to the foregoing, the CE device 12 may also include one or more input ports 26 such as, e.g., a high definition multimedia interface (HDMI) port or a USB port to physically connect (e.g. using a wired connection) to another CE device and/or a headphone port to connect headphones to the CE device 12 for presentation of audio from the CE device 12 to a user through the headphones. For example, the input port 26 may be connected via wire or wirelessly to a cable or satellite source of audio video content. Thus, the source may be, e.g., a set top box, or a satellite receiver, or a game console or disk player.

The CE device 12 may further include one or more tangible computer readable storage medium 28 such as disk-based or solid state storage. Also in some embodiments, the CE device 12 can include one or more position or location receivers such as but not limited to a cellphone receiver, GPS receiver and/or altimeter 30 that is configured to e.g. receive geographic position information from at least one satellite or cellphone tower and provide the information to the processor 24 and/or determine an altitude at which the CE device 12 is disposed in conjunction with the processor 24. However, it is to be understood that that another suitable position receiver other than a cellphone receiver, GPS receiver and/or altimeter may be used in accordance with present principles to e.g. determine the location of the CE device 12 in e.g. all three dimensions.

Continuing the description of the CE device 12, in some embodiments the CE device 12 may include one or more cameras 32 that may be, e.g., a thermal imaging camera, a digital camera such as a webcam, and/or a camera integrated into the CE device 12 and controllable by the processor 24 to gather pictures/images and/or video in accordance with present principles. Also included on the CE device 12 may be a Bluetooth (including low energy Bluetooth) transceiver 34 and other Near Field Communication (NFC) element 36 for communication with other devices using Bluetooth and/or NFC technology, respectively. An example NFC element can be a radio frequency identification (RFID) element.

Further still, the CE device 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), other type of proximity sensor such as a camera executing image recognition to determine a particular object is close, etc.) providing input to the processor 24. In addition to the foregoing, it is noted that the CE device 12 may also include an infrared (IR) transmitter and or IR receiver and/or IR transceiver 40 such as an IR data association (IRDA) device. A battery (not shown) may be provided for powering the CE device 12.

The CE device 12 may include still other sensors such as e.g. one or more climate sensors 42 (e.g. barometers, humidity sensors, wind sensors, light sensors, temperature sensors, etc.) and/or one or more biometric sensors 44 providing input to the processor 24. For instance, the biometric sensor(s) may include heart rate sensors, temperature sensors, blood pressure sensors, blood sugar sensors, perspiration sensors, etc.

As well, an example CE device 12 may include a fingerprint reader (FPR) 46 and a vibrating device or vibrator 48 controllable by the processor 24 to generate a tactile signal, such as vibration or tapping, onto the housing of the CE device. In some examples, a separate FPR need not be provided. Instead, FPR scanning hardware and software is coupled to the touch screen display 15, for purposes to be disclosed below.

The components of a CE device 12 may communicate with each other via wires and/or wirelessly.

The above methods may be implemented as software instructions executed by a processor, suitably configured ASIC or FPGA modules, or any other convenient manner as would be appreciated by those skilled in those art. Where employed, the software instructions may be embodied in a non-transitory device such as a CD Rom or Flash drive. The software code instructions may alternatively be embodied via a download over the internet.

Present principles envision that an owner of the CE device 12 may avail himself of the use of an electronic bank card 50 for, e.g., conducting monetary transactions with a bank kiosk (ATM) 52, or for effecting remote transactions with one or more servers 54 over the Internet 56. Note that "bank" is used generically herein to refer to any institution providing financial services via electronic credit or debit cards.

In some embodiments, the bank card 50 includes a first electronic circuit that is configured to respond to interrogation signals from the kiosk 52 by using the signals to momentarily power or excite the circuit 58 to emit a short range NFC signal from an NFC element 60, such as an RFID tag. If desired, the bank card 50 may operate under control of one or more processors 62 accessing one or more computer readable storage media 64 such as disk-based or solid stat storage. In some examples the bank card 50 may include a Bluetooth (including low energy Bluetooth) transceiver 66 and a second circuit 68 that may include a power source, such as a battery or a capacitor which receives its charge by means of interrogation signals conducting in the first circuit 58.

Those interrogation signals may be sent from an NFC element 70 such as an NFC reader in the kiosk 52. The kiosk 52 may operate under control of one or more processors 72 accessing one or more computer readable storage media 74 such as disk-based or solid state storage. Input to the processor 72 may be provided from an input device 76 such as a keyboard or keypad and input and output may be provided via a touch screen display 78.

An Internet server typically operates under control of one or more processors 80 accessing one or more computer readable storage media 82 such as disk-based or solid stat storage.

Present principles understand that interrogation signals may be sent to the bank card 50 from unauthorized sources, such as an NFC reader wielded by a larcenous hacker nearby the bearer of the bank card 50.

Figure 2:
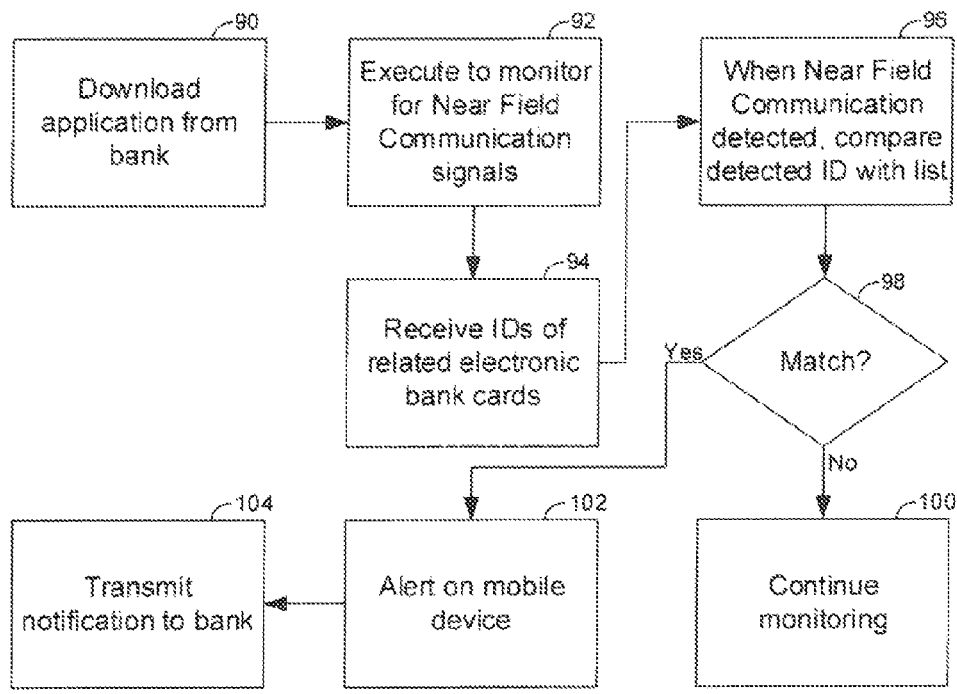
FIG. 2 is a flow chart showing example CE device logic for monitoring electronic bank card ("e-card") transactions.

FIG. 2 shows example logic for allowing an e-card owner's mobile device (e.g., the CE device 12 belonging to the owner of the e-card 50) to passively eavesdrop on all e-card transactions. Commencing at block 90, a monitoring application may be downloaded by the CE device 12 from a bank server 54. The monitoring application may be obtained by other means. In any case, the monitoring application permits the bank and owner to correlate identifications of the owner's e-cards with the owner's CE device in a manner that enables the CE device 12 to receive signals from e-cards containing identifying data of the e-cards, and to compare those identifications with a database of e-card identifications typically stored in the CE device 12 (or, as discussed above, stored in the ban server 54). As an example, when the bank issues the e-cards to a customer, the bank may populate the application to be downloaded to the customer's CE device with the identifying data of the e-cards. Or, the application may prompt the customer to enter identifying data of the e-cards into the CE device 12. The application may cause the CE device to send its own network address and/or device identification back to the bank server. This discussion applies to additional logic described below, in which the CE device may obtain an application to execute the logic. Without limitation, an e-card ID may be established by, e.g., a smart card number or a serial number or a media access control (MAC) address of the e-card.

In any case, at block 92 the application is executed, and the CE device passively monitors for signals from the owner's e-cards. To do this, a monitoring daemon may run constantly or periodically in the background processes of the CE device processor to monitor for, e.g., received NFC signals from the NFC element 36 of the CE device. The daemon may be started upon user command or simply upon initialization of the application.

Any e-card identifications (IDs) contained in nearby NFC transmissions, when sensed by the CE device, are received at block 94. Moving to block 96, the detected e-card ID(s) are compared to the e-card IDs stored in the CE device 12. Alternatively, upon detection of an NFC signal carrying an ID, the CE device 12 may automatically or upon user prompt connect to the bank server 54 and send the detected IDs to the server for comparison by the server, and not the CE device, against the database of e-card IDs belonging to the owner of the CE device 12.

Regardless of where the comparison takes place, if a match is not found at decision diamond 98, the CE device continues to monitor for NFC signals at block 100. On the other hand, responsive to a match being found at decision diamond 98, indicating that the e-card of the owner of the CE device 12 has potentially responded to an interrogation signal by emitting a response via the first circuit 58 shown in FIG. 1, an alert is generated at block 102 on the CE device 12. The alert may be an audible alert generated through the speakers 16, a tactile alert generated through the vibrator 48, a visual alert presented on the display, or a combination of any of the above.

Also, when the logic of FIG. 2 is executed entirely by the CE device 12, at block 104 the CE device 12 may automatically transmit to the bank server 54 a notification that its e-card has been interrogated. The notification may be a wireless message containing information as to the ID of the e-card, the amount of the transaction, and if known, the ID of the interrogating device.

Figure 3:
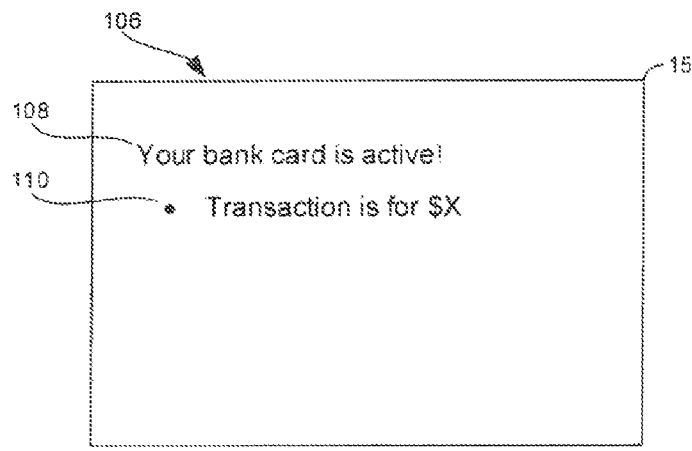
FIG. 3 is a screen shot of an example user interface (UI) related to the logic of FIG. 2.

FIG. 3 shows an example UI 106 that may be presented on the display 15 of the CE device 12 responsive to a positive test at diamond 98 in FIG. 2. As shown, a message 108 may be presented indicating that the owner's e-card has been interrogated or otherwise has emitted identifying information. Also, if desired a message 110 may be presented indicating the amount of the transaction that was sensed by the CE device 12. In this way, the owner of an e-card is alerted, by means of his CE device, to potentially fraudulent transactions.

Figure 4:
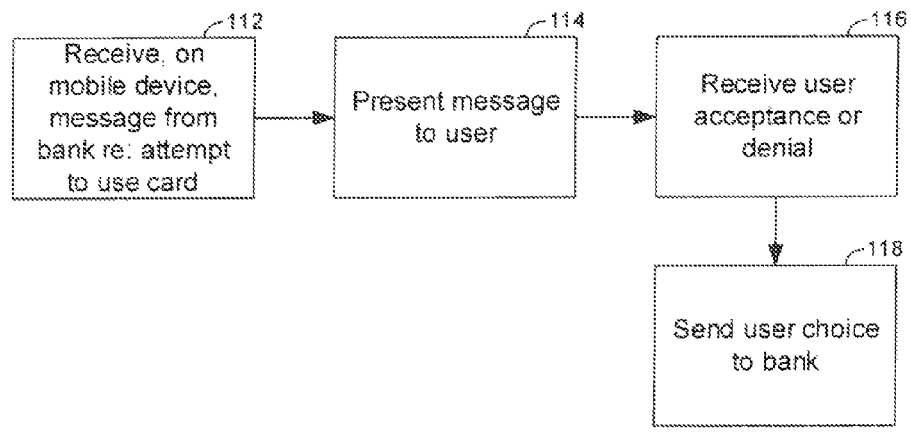
FIG. 4 is a flow chart showing example CE device logic for accepting or denying e-card transactions.

FIG. 4 shows additional logic that may be employed to alert an owner, via the owner's CE device, of a potentially fraudulent use of an e-card of the owner. Commencing at block 112, the CE device receives, from the bank server 54/bank kiosk 52, a message that an e-card associated with the CE device owner according to principles described above has been in communication with an e-card reader, such as the kiosk, associated with the bank. For example, if a person has presented an e-card to the kiosk 52, or if the person has attempted to conduct a transaction with the bank server 54 or other server over the Internet, the bank will send a message of this fact to the CE device, which is received at block 112.

In one example, the message is a text message, such as but not limited to a short message service (SMS) message. Or, the message may be established by or include a photograph such as might be taken of the person attempting to use the e-card by a camera at the kiosk 52. The message is displayed on the CE device at block 114 and may request the user to accept or deny the attempted transaction being reported. Accordingly, a user selection of accept or deny is received by the CE device at block 116 and sent to a bank server or computer at block 118, with the bank allowing or disallowing the transaction accordingly.

Figure 5:
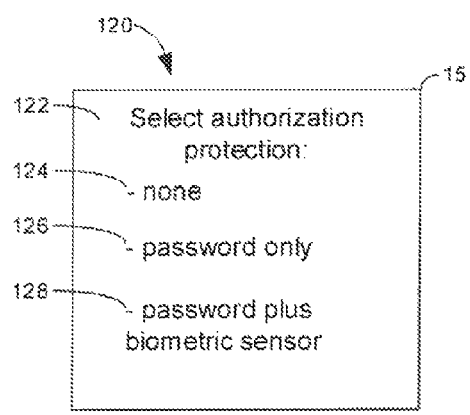
FIGS. 5 and 6 are screen shots of example CE device UIs for establishing authentication protection and authorizing e-card transactions.
Figure 6:
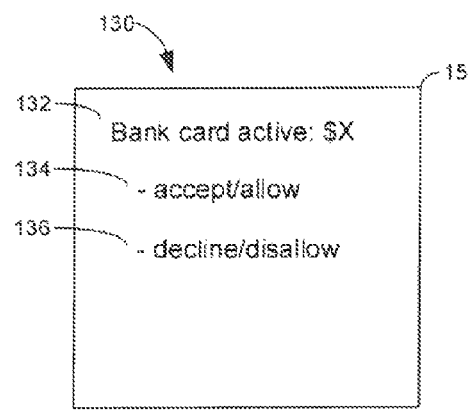

FIGS. 5 and 6 illustrate implementations of the logic above. Initially, a user may be presented with the UI 120 (FIG. 5) with a prompt 122 to select a desired level of authentication protection for authenticating subsequent e-card transactions. In the example the user may select a "none" selector 124, selection of which permits future authentications using the CE device not to require a password, a "password only" selector 126, selection of which mandates that future authentications using the CE device must include entry of a correct password, and a "password plus biometric" selector 128, selection of which mandates that future authentications using the CE device must include entry of a correct password and entry of a correct biometric input.

When a subsequent UI 130 is automatically presented on the CE device 12 informing 132 of the user that a particular e-card has been sought to be used for a transaction, along with the dollar amount of the transaction as shown, the user may select an accept/allow selector 134 to authorize the transaction to proceed, or a decline/disallow selector 136 to prevent the transaction from being consummated. In the example shown in FIG. 6, no password or biometric input is prompted for, meaning the user had previously selected the "none" selector 124 of FIG. 5. Had the user selected the "password only" selector 126, a password would first be required to be entered correctly prior to presenting selectable selectors 134, 136 (they may be presented in grey, and unselectable, until entry of a correct password). Similarly, had the user selected the "password plus biometric" selector 128, a password plus a correct biometric input would first be required to be entered correctly prior to presenting selectable selectors 134, 136. Example biometric inputs are discussed further below, but in general identify a physical characteristic of the user.

Figure 7:
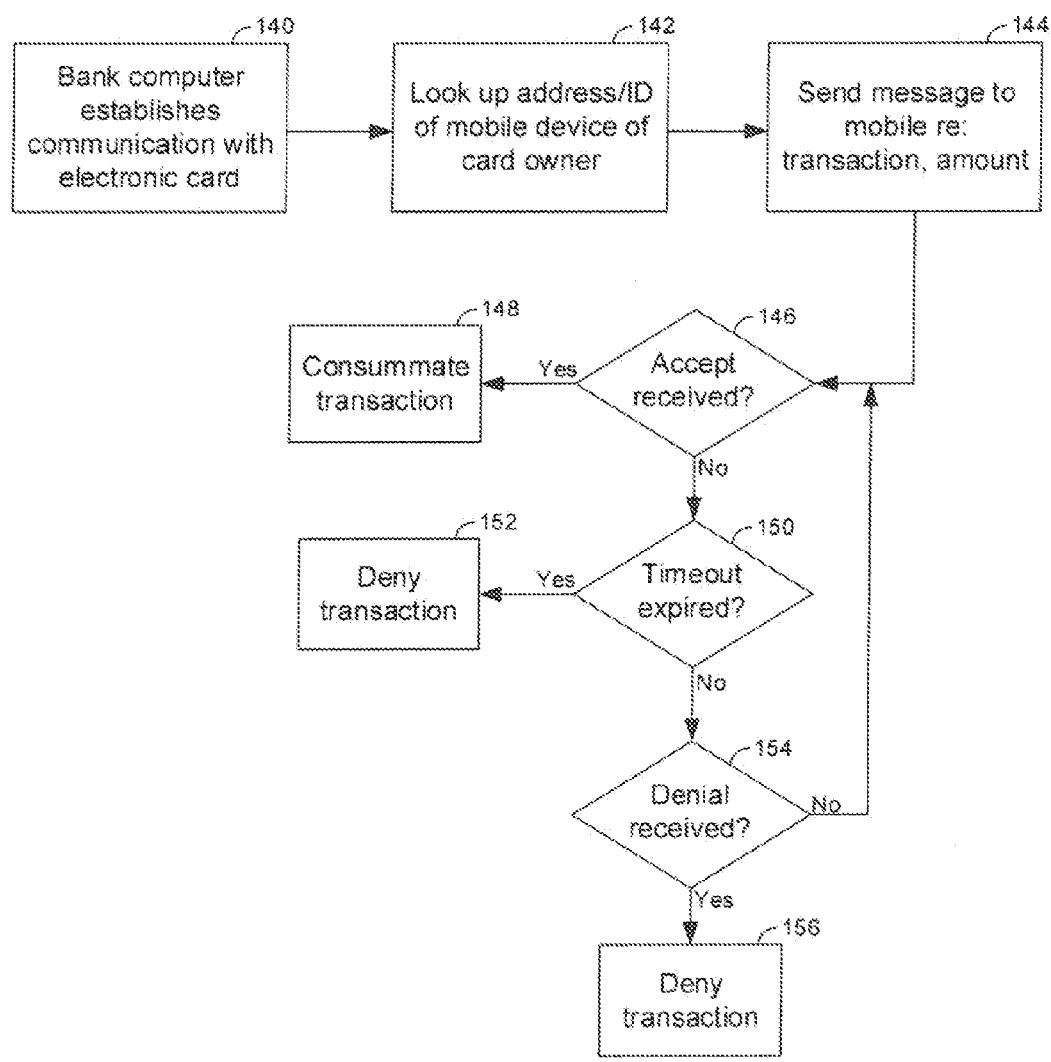
FIGS. 7 and 8 are flow charts of alternate examples of bank computer logic for receiving CE device authorization for e-card transactions.
Figure 8:
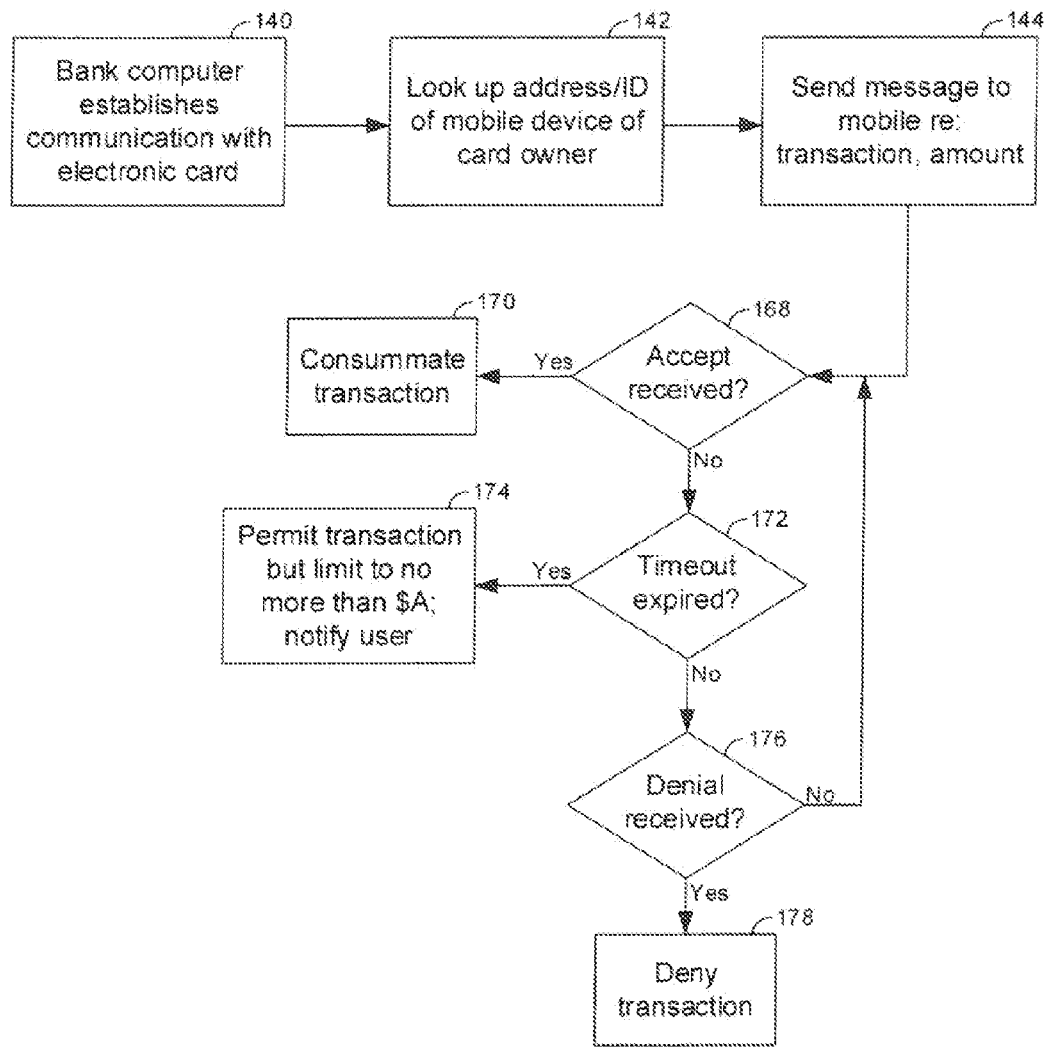

In some embodiments, if the message from the CE device to accept or decline a transaction is not received in a timely way by the bank, the transaction can be 1) terminated, or 2)

can be limited to be no more than a predetermined dollar value, or the overall limit of the e-card can be lowered. FIGS. 7 and 8 illustrate.

Commencing at block 140, the bank computer or server 54 or the kiosk 52 established communication, e.g., using NFC, with the e-card 50. Based on identifying information from the e-card, the bank computer/kiosk at block 142 looks up the network address or other identifying information of the CE device 12 that has been associated with the e-card as described previously. Then, at block 144 the bank sends a message to the CE device 12 regarding the fact of the prospective transaction and the amount, if desired.

If the bank receives back an acceptance signal from the CE device at decision diamond 146, the transaction is consummated at block 148 by the bank. If no acceptance is received and a timeout has expired as determined by the bank computer/kiosk at decision diamond 150, the transaction is denied at block 152. Likewise, if prior to expiration of the timeout period, a denial signal from the CE device is received by the bank at decision diamond 154, the transaction is denied at block 156.

The logic of FIG. 8 differs from that of FIG. 7 as follows. Commencing at block 160, the bank computer or server 54 or the kiosk 52 establishes communication, e.g., using NFC, with the e-card 50. Based on identifying information from the e-card, the bank computer/kiosk at block 162 looks up the network address or other identifying information of the CE device 12 that has been associated with the e-card as described previously. Then, at block 164 the bank sends a message to the CE device 12 regarding the fact of the prospective transaction and the amount, if desired.

If the bank receives back an acceptance signal from the CE device at decision diamond 168, the transaction is consummated at block 170 by the bank. If no acceptance is received and a timeout has expired as determined by the bank computer/kiosk at decision diamond 172, the transaction is permitted at block 174 but not for the full amount if the full amount exceeds a threshold. For example, if the threshold is $10 and the attempted transaction, say, a cash withdrawal from an ATM, is requested for $20, the ATM returns only $10, and the CE device of the user may be sent a message of this fact. However, under this hypothetical threshold $10 and the attempted transaction, say, a cash withdrawal from an ATM, is requested for $5, the ATM provides the entire $5 because it is below the threshold.

On the other hand, if prior to expiation of the timeout period, a denial signal from the CE device is received by the bank at decision diamond 176, the transaction is denied at block 178.

In some embodiments, the message sent by the bank to the CE device, which recall may be a text message, may contain a code that the user of the CE device must input into the kiosk 52 or other point-of-sale (POS) terminal at which the e-card was presented in order to complete the transaction. Or, the CE device may be required to send an authorization signal to the e-card pursuant to the message from the bank to trigger the e-card to complete the transaction.

Thus, the loop with the user is closed when a bank card is used, whether it is a mag-strip or an NFC-based e-card, as a fraud prevention. If the card is separated from the user (with CE device), the card cannot be used.

Figure 9:
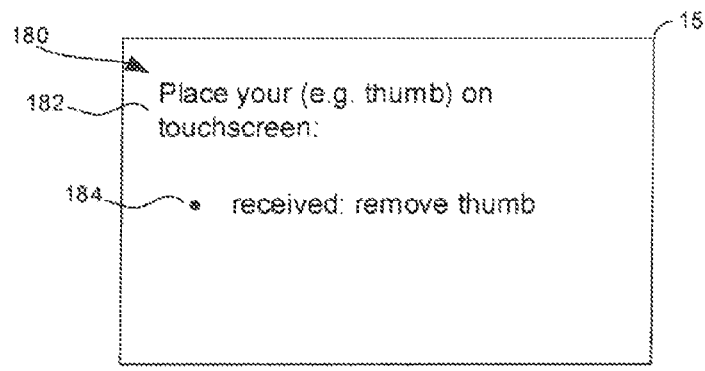
FIG. 9 is a screen shot of an example CE device UI for inputting biometric information via a touch screen display.
Figure 10:
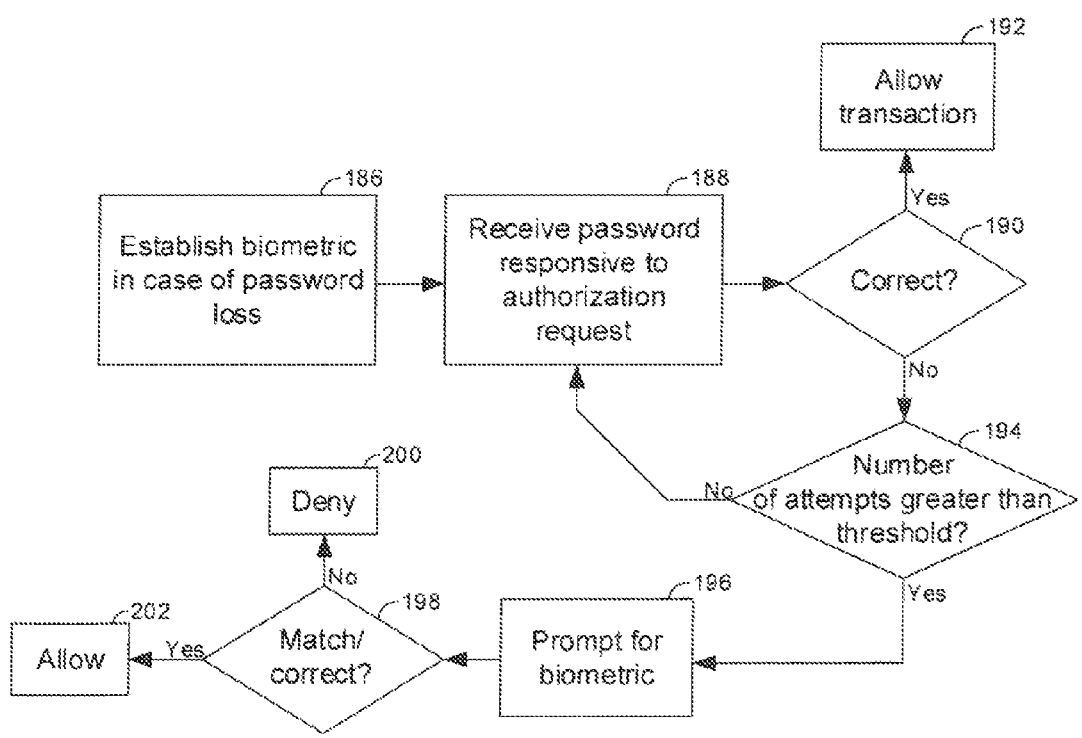
FIGS. 10 and 11 are flow charts of example alternate logic for dealing with a lack of proper two factor authentication.

FIGS. 9 and 10 illustrate additional security features. FIG. 9 shows a UI 180 that the above-discussed application when executed may cause to be presented on the CE device. As shown, the UI 180 includes a prompt 182 for the user to place his or her thumb or other identifying part on the display 15, in which embodiment FPR sensors may underlie the display 15 as mentioned previously. When the application has successfully read the print, a message 184 may be presented informing the user of this fact. The image or print of the user's thumb is then stored for use in FIG. 10 as a template. Note that the biometric template may be other than a fingerprint as set forth elsewhere herein.

Commencing at block 186, a biometric template is established for use in case of loss of a password for the CE device 12. Such a password may be required to be input to the CE device 12 to unlock the ability to send the transaction acceptance signal at states 146 and 168 in FIGS. 7 and 8, respectively.

Indeed and moving to block 188, a password is received as input by the CE device 12 based on user manipulation of an input element of the CE device. As indicated, the password may be input responsive to a prompt for password input to authorize a card transaction reported by the bank by means of, e.g., the above-described text message.

If the password is determined to be correct at decision diamond 190, the CE device is unlocked to send to the bank an acceptance signal to allow the transaction at block 192. However, if the password is incorrect, it is determined at decision diamond 194 whether the number of attempts to enter a password exceeds a threshold. If not, the logic loops back to block 188 to prompt the user to try again.

On the other hand, and a number of attempts to enter the password exceeds a threshold at decision diamond 194, the logic moves to block 196 to prompt the user to enter a biometric input, such as, e.g., placing the user's thumb on the display 15. The CE device processor determines at decision diamond 198 whether the biometric input is correct by determining if it matches the template established at block 186. If the biometric input does not match the template, the transaction is denied at block 200 by, e.g., the CE device 12 sending a denial signal to the bank according to principles discussed above. In contrast, if the biometric input matches the template, the transaction is allowed at block 202 by, e.g., the CE device 12 sending an approval or authorization signal to the bank.

Figure 11:
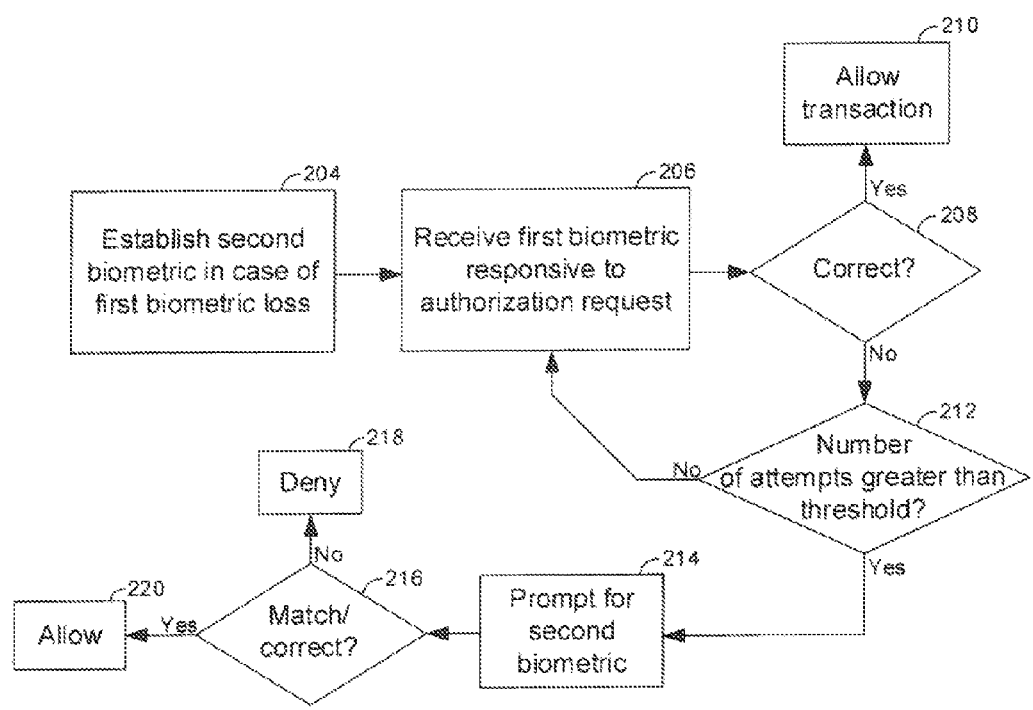

FIG. 11 shows logic that differs from that in FIG. 10 in the following respects. Commencing at block 204, a biometric template is established for use in case of loss of a first biometric-based password for the CE device 12. Such a loss may be occasioned by, e.g., the fact of the first biometric password being a voice print, followed by inoperability of the microphone 18 of the CE device 12, rendering subsequent attempts to input a voice signal nugatory.

The (first) biometric-based password may be required to be input to the CE device 12 to unlock the ability to send the transaction acceptance signal at states 146 and 168 in FIGS. 7 and 8, respectively. Such a biometric-based password, which may be referred to as a first biometric, may be established by establishing a template at setup along the lines discussed above, just as the second biometric signal to be used in case of unavailability of the first biometric signal may also be established at setup.

Moving to block 206, a biometric signal intended to match the template is received as input by the CE device 12. As indicated, the biometric signal may be input responsive to a prompt for input to authorize a card transaction reported by the bank by means of, e.g., the above-described text message.

If the biometric signal is determined to match the template at decision diamond 208, the CE device is unlocked to send to the bank an acceptance signal to allow the transaction at block 210. However, if the input does not match the template, it is determined at decision diamond 212 whether the number of attempts to enter a biometric signal exceeds a threshold. If not, the logic loops back to block 206 to prompt the user to try again.

On the other hand, and a number of attempts to enter the signal exceeds a threshold at decision diamond 212, the logic moves to block 214 to prompt the user to enter a second biometric input having a template to match it against that is established according to the above principles. The second biometric may be, e.g., a fingerprint, facial image, etc., preferably being sensed by an input device different than that required to receive the first biometric signal.

The CE device processor determines at decision diamond 216 whether the biometric input is correct by determining if it matches the template established at block 204. If the second biometric input does not match the template, the transaction is denied at block 218 by, e.g., the CE device 12 sending a denial signal to the bank according to principles discussed above. In contrast, if the biometric input matches the template, the transaction is allowed at block 220 by, e.g., the CE device 12 sending an approval or authorization signal to the bank.

In some implementations, when the number of entry attempts exceeds the threshold, the CE device may lock itself, essentially disabling further use for any purpose. In some cases it may "white itself" erasing all data from the CE device. If the data on the CE device is encrypted, then this may be done by erasing the key used to decrypt the data.

Figure 12:
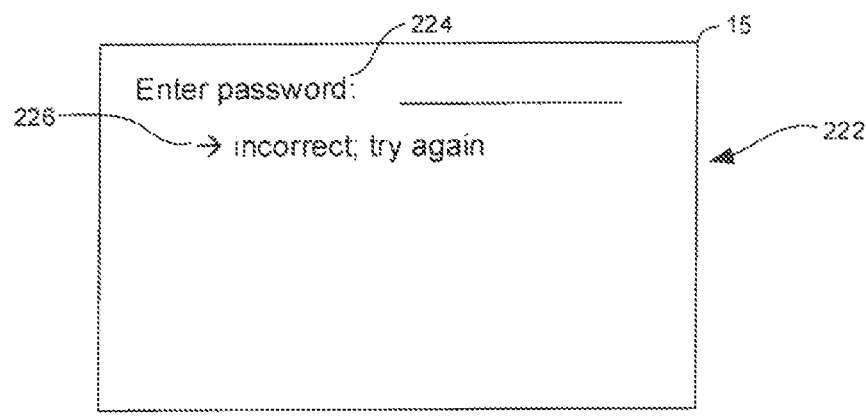
FIGS. 12 and 13 are example CE device UIs related to FIGS. 10 and 11.
Figure 13:
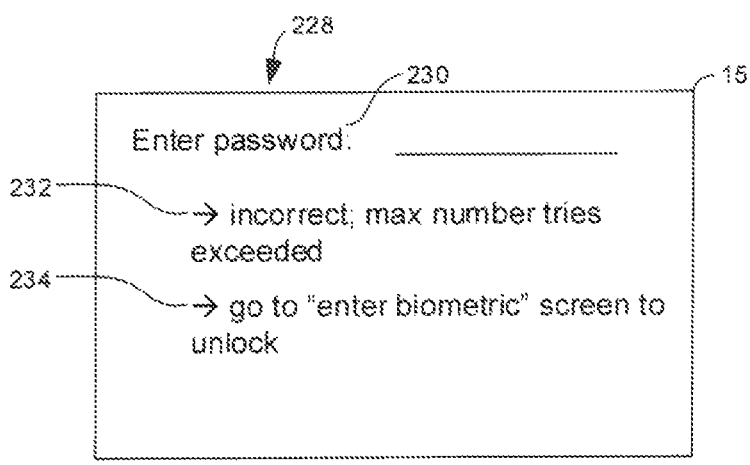

FIGS. 12 and 13 show example UIs that can be presented on the CE device 12 according to the logic of FIG. 10, it being understood that similar UIs suitably modified can also support the logic of FIG. 11. A UI 222 may include a prompt 224 to enter the password needed to enable the CE device to respond to the text message from the bank to permit the card transaction. If the password entered is incorrect, the user can be prompted 226 of such fact and urged to try to enter the password again.

Recall that a maximum number of password entry attempts may be established. If this is the case and the maximum threshold is violated, the UI 228 of FIG. 13 may be presented, prompting 230 to enter the password and then if the password is incorrect and the maximum threshold is violated, the user is presented a prompt 234 to go to a biometric input screen, which prompt 234 if selected invokes a screen instructing the user as to entry of the biometric signal discussed in relation to FIG. 10.

Biometric signals can include facial images that are analyzed using face recognition software, iris imaging, a signature or other handwriting, a voice print, a palm print, a finger print.

The logic of comparing biometric signals to templates may be executed by the CE device processor, or the biometric inputs may be sent from the CE device to the bank server 54 or kiosk 52 for analysis there, with the bank computer then allowing (or not) the transaction if a match is present.

Note further that biometric input may include biometric data per se as well as metadata such as date and time of input, location of the CE device when the biometric signal is received, etc. This metadata can be used in addition to the biometric data to determine whether to allow or disallow the transaction. For example, if the location at which a facial image is received is beyond a predetermined radius of a bank kiosk at which the transaction is being attempted, the transaction may be disallowed even if the biometric input matches the template based on the inference that a user's photo has been purloined by a thief and is being used to spoof the system.

Figure 14:
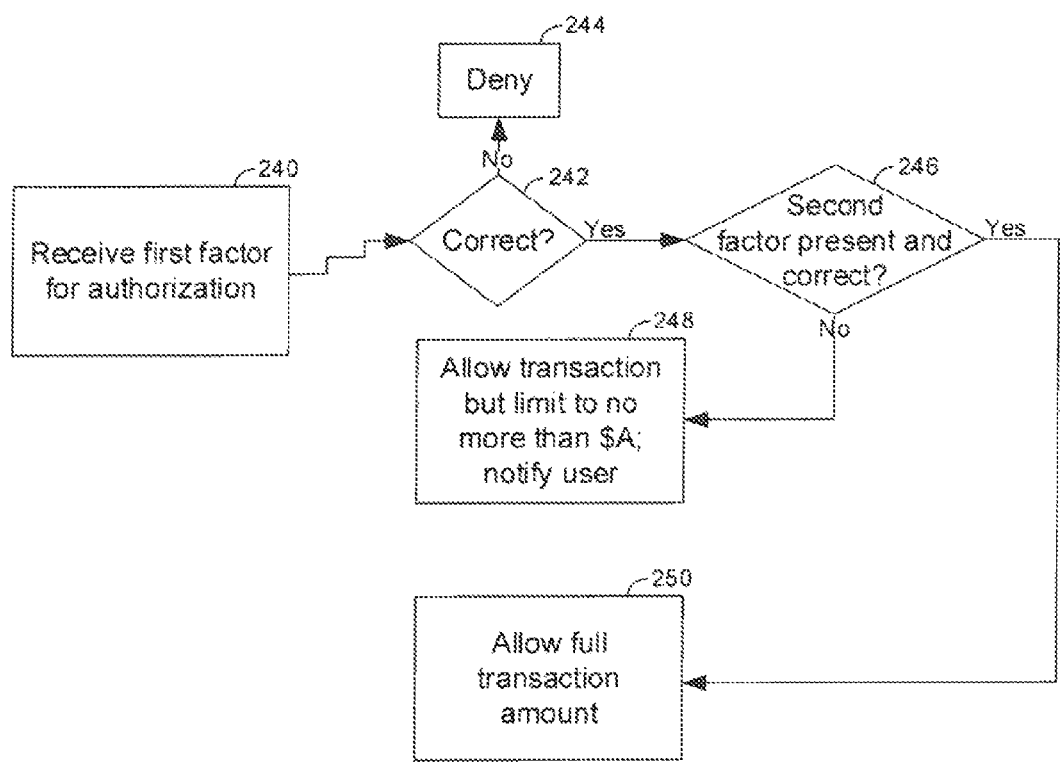
FIGS. 14 and 15 are flow charts of alternate example logic for authentication.
Figure 15:
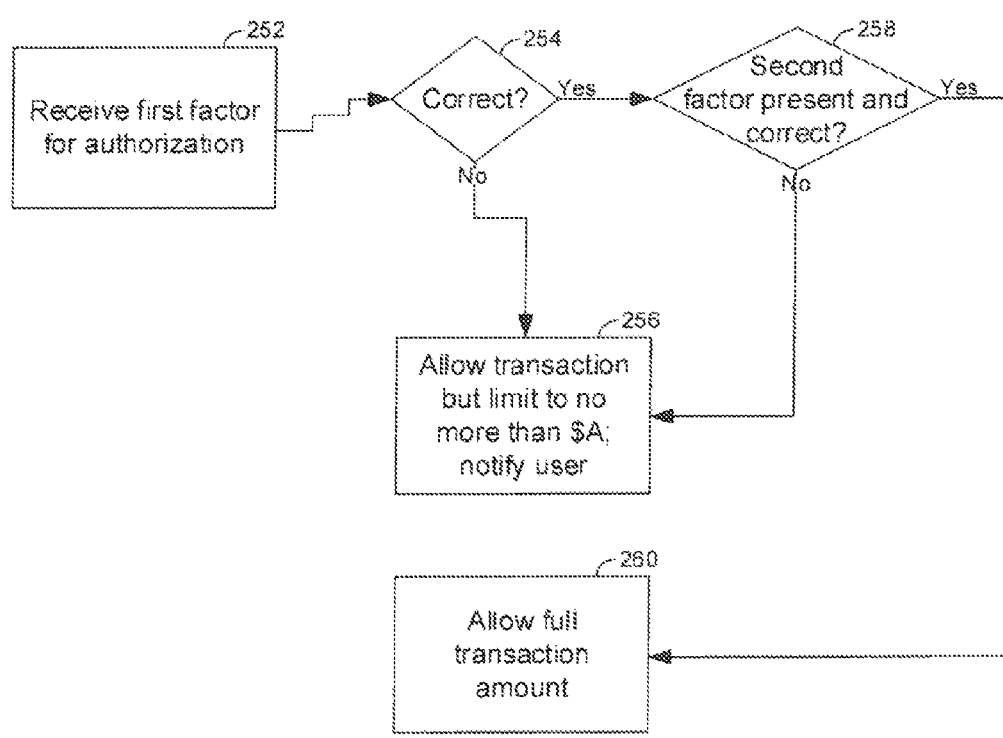

FIGS. 14-16 illustrate limiting transaction amounts based on an authentication device such as a CE device 12 not being local to an e-card attempting a transaction and/or based on a lack of one of two authentication factors.

Commencing at block 240 in FIG. 14, a first factor for authentication is received. This first factor may be a password or it may be a biometric signal. Typically, the two factors in two-factor authentication require a person seeking access to know something (e.g., a password), and to possess something (e.g., a fob, a biometric characteristic).

At decision diamond 242 the CE device 12 determines whether the first factor received at block 240 is correct. If the first factor is a password, the CE device checks a password template to determine whether the input password matches the template. If the first factor a biometric signal, the CE device checks a biometric template to determine whether the biometric input matches the template.

If the first factor is not correct, the transaction is denied at block 244. However, if the first factor is correct, the CE device prompts the user to input a second factor signal if not already input and determines at decision diamond 246 whether this second factor is correct. If the second factor input fails to match the corresponding template, the transaction is allowed at block 248 with the caveat that the transaction amount is limited to be no more than a predetermined monetary value. The user is then notified of this limitation by, e.g., a message on the display 15 of the CE device 12, and the transaction is authorized for the desired amount if under the predetermined monetary value, and at the predetermined monetary value if over that value. Successful input of the second factor at decision diamond 246 results in the full transaction being allowed at block 250 even if above the predetermined monetary value.

Commencing at block 252 in FIG. 15, a first factor for authentication is received. This first factor may be a password or it may be a biometric signal. Typically, the two factors in two-factor authentication require a person seeking access to know something (e.g., a password), and to possess something (e.g., a fob, a biometric characteristic).

At decision diamond 254 the CE device 12 determines whether the first factor received at block 252 is correct. If the first factor is a password, the CE device checks a password template to determine whether the input password matches the template. If the first factor a biometric signal, the CE device checks a biometric template to determine whether the biometric input matches the template.

If the first factor is not correct, the logic proceeds to block 256. At block 256, the transaction is allowed with the caveat that the transaction amount is limited to be no more than a predetermined monetary value. The user is then notified of this limitation by, e.g., a message on the display 15 of the CE device 12, and the transaction is authorized for the desired amount if under the predetermined monetary value, and at the predetermined monetary value if over that value However, if the first factor is correct, the CE device prompts the user to input a second factor signal if not already input and determines at decision diamond 258 whether this second factor is correct. If the second factor input fails to match the corresponding template, the logic moves to block 256 to operate as described. Successful input of the second factor at decision diamond 258 results in the full transaction being allowed at block 260 even if above the predetermined monetary value. Thus, in contrast to the logic of FIG. 14, in which a transaction is denied if the first factor fails, in FIG. 15 the transaction is always permitted even if no authentication is successfully received, albeit with a lowered transaction limit. Also or alternatively the overall credit of the e-card may be lowered in the absence of correct authentication factor or factors.

FIG. 16 begins at decision diamond 260 by determining whether the authenticating device such as the CE device 12 is proximate to the e-card 50 attempting to execute a transaction with, e.g., the kiosk 52. This may be done by the kiosk detecting an NFC signal from both the e-card and the CE device 12 responsive to, e.g., an interrogation signal emitted from the kiosk, indicating that the CE device is local. Or, it may be done by the kiosk querying the CE device for its location information as derived from, e.g., its GPS receiver 30, and if the CE device location matches that of the kiosk, the CE device is determined to be local. Responsive to a determination that the CE device is local, the transaction is permitted or authorized at block 262; otherwise, the transaction is denied (or limited to a predetermined monetary value according to principles discussed above) at block 264.

FIGS. 17, 17A, and 18 illustrate an e-card actively communicating with an authenticating device such as the CE device 12 using, e.g., NFC communication, low energy Bluetooth communication, or other communication protocol. Commencing at block 266 of FIG. 17, the e-card 50 receives an interrogation such as an NFC interrogation signal from, e.g., the kiosk 50. The e-card in turn sends, at block 268, a notification to the CE device 12 that it has been interrogated. In the logic of FIG. 17, the logic ends at state 268, with the e-card responding to the interrogation without command to do so from the CE device, simply notifying the CE device of the interrogation.

The e-card 50 may be provided with a battery to power the transmitter it uses to signal the CE device 12. Or, it may employ its second circuit 68, which recall may include a capacitor that is charged when the first circuit 58 is excited by an interrogation signal from the kiosk 52. The capacitor may be discharged to power the transmitter to signal the CE device 12.

In FIG. 17A, commencing at block 270 the e-card 50 receives an interrogation such as an NFC interrogation signal from, e.g., the kiosk 50. The e-card in turn sends, at block 272, a notification to the CE device 12 that it has been interrogated. In this logic, the e-card does not immediately respond to the interrogation signal from the kiosk. Instead, it determines at decision diamond 274 whether it has received an authorization signal for the transaction from the CE device 12. If it has, the e-card 50 responds to the kiosk interrogation at block 278. In the absence of an authorization from the CE device responsive to the notification sent at block 272, however, the logic flow from decision diamond 274 to block 280 in which the e-card ignores the interrogation signal from the kiosk.

FIG. 18 shows a UI 280 that can be presented on the display 15 of the CE device 12 in response to the above interrogation notifications from the e-card 50. As alpha-numeric notification 282 is presented informing the user that the e-card has been interrogated, in the example shown, for its identification, and if desired for the monetary amount of the transaction. The user is prompted 284 to indicate whether the e-card should respond to the interrogation by selecting a "yes" selector 286, resulting in a signal being sent to the e-card to execute the logic at block 278, or by selecting "no", resulting in a signal being sent to the e-card to execute the logic at block 280.

FIG. 19 illustrates logic in which the CE device 12 periodically pings the e-card 50 to discover whether a transaction occurred. In this way, fraudulent transactions with the e-card may be detected by alerting the user that a transaction occurred.

Commencing at block 290, the CE device 12 receives the ID/s addresses of the user's e-cards according to principles discussed previously. Moving to block 292, the CE device 12 contacts, e., periodically or based on event-driven criteria, the e-card 50. This contact may be through, for example, NFC or low energy Bluetooth or other protocol. The contact may be an interrogatory from an NFC element such as an RFID reader on the CE device 12 to command the e-card to send transaction history information to the CE device. The reported transactions, preferably by type, monetary amount, and transaction partner ID, are received by the CE device from the e-card and recorded on the CE device 12 at block 294. At block 296 the CE device may transmit the transaction history of the e-card to, for instance, the bank server 54, in some cases automatically without user input.

FIGS. 20-23 illustrate techniques for denying transaction when it can be determined that no legitimate POS terminals are in the area. The CE device 12 executing the application mentioned previously can send pertinent information to the bank via the Internet. Location information can be used to approve or disapprove a transaction locally or it can relay location information to the bank server to approve or disapprove a transaction.

Accordingly and commencing at block 300 in FIG. 20, a transaction request is received by the CE device from an associated e-card over, e.g., low energy Bluetooth or NFC. Typically this request may be made by the e-card in response to being interrogated by a POS terminal such as the kiosk 52 for information.

Responsive to this request from the car, at block 302 a request message and/or a POS terminal map may be presented on the display 15 of the CE device 12. If the CE device determines that the CE device is not within a threshold distance of a POS terminal, at block 304 the CE device automatically instructs the e-card not to execute the transaction without user input to do so.

To do this, the CE device may access a stored map of POS terminal locations. The CE device may then compare its location as indicated by, e.g., the GPS receiver 30 to one or more of the locations on the map, and then determine the distance between the nearest POS terminal and the GPS location of the CE device. If this distance exceeds the threshold, the logic of block 304 is executed. Note that the CE device 12 may also send a message to the bank server 54 reporting the denial of the transaction along with the transaction details described above.

FIG. 21 shows an alternative in which the request from the e-card is denied only pursuant to user input. Accordingly and commencing at block 306 in FIG. 21, a transaction request is received by the CE device from an associated e-card over, e.g., low energy Bluetooth or NFC. Typically this request may be made by the e-card in response to being interrogated by a POS terminal such as the kiosk 52 for information.

Responsive to this request from the car, at block 308 a request message and/or a POS terminal map may be presented on the display 15 of the CE device 12. The user may view the presented information and decide whether to accept or deny the transaction at block 310, with the CE device 12 signaling the e-card 50 to complete or not to complete the transaction according to the user input. An example UI for doing so is described below. Note that the CE device 12 may also send a message to the bank server 54 reporting the denial of the transaction along with the transaction details described above.

FIG. 22 shows a UI 312 that can be presented on the display 15 of the CE device 12. A message 314 indicates that the user's e-card has been interrogated, based on the report from the e-card received at block 300 in FIG. 20. Also, an advisory 316 is presented informing the user that the transaction was denied because no POS terminal was located in the immediate area. The advisory 316 may also indicate that the user's bank has been automatically notified.

FIG. 23 shows that a UI 318 may be presented on the display 15 of the CE device 12 under the logic of FIG. 21. As shown, the UI may include a message 320 indicating that the user's e-card has been interrogated, based on the report from the e-card received at block 306 in FIG. 21. Additionally, a graphic or photographic-based map 322 may be presented indicating at 324 the current location of the CE device 12 as obtained from, e.g., the GPS receiver 30, and also indicating at 326 the locations of the nearest POS terminals. The user may view this information and then select a selector 328 to cause the e-card to complete the transaction, or a no selector 330 to cause the e-card to refuse the transaction, to execute the logic of block 310 in FIG. 21.

FIGS. 24 and 25 illustrate logic to reduce fraud by quickly comparing e-card transaction details as reported to the associated CE device 12 with bank transaction records. The CE device 12 monitors transactions at block 332 between the e-card and a POS terminal according to principles discussed above. The CE device sends this information at block 334 to the bank server 54, periodically or event-driven.

At block 336 in FIG. 25, the bank server 54 receives the transaction reports from the CE device and at block 338 compares the transaction records of the POS terminal (which are available to the bank server 54, e.g., when the kiosk 52 is the POS terminal) with the transaction reports from the CE device 12. If the CE device reports match the bank records at decision diamond 340, the logic ends at state 342. On the other hand, if the CE device reports fail to match the bank records at decision diamond 340, the logic moves to block 344 to return "possible fraud". A message reporting this possibility may be sent to the CE device at block 346 if desired.

Hack attempts can thus be documented by reporting incidents to a central location such as the bank server 54. The bank server 54 may consolidate deviating transaction reports from CE devices to analyze for patterns based on locations of reported transaction that do not match locations of POS terminals, time of day, day of the week, etc. Such patterns can be used to help identify the possible dwelling areas and habits of hackers. For example, if N deviant transactions in the aggregate were reported from M CE devices, with N and M being integers greater than one, to have been executed within a distance P of a particular location at which no POS terminal exists, it may be inferred that a hacker habituates the neighborhood of the location. Furthermore, if the deviant transactions occurred primarily in week days during the middle of the day, it may be inferred that the hacker has no job. In the same vein, if the deviant transactions occurred primarily at times after the normal work day, it may be inferred that the hacker has a job, or that the hacker's modus operandi is preying on victims made perhaps a bit vulnerable from after-work visits to entertainment establishments in the area.

It will be appreciated that while the USING MOBILE DEVICE TO MONITOR FOR ELECTRONIC BANK CARD COMMUNICATION has been fully described in relation to one or more example embodiments, these are not intended to be limiting, and that various alternative arrangements may be used to implement the subject matter claimed herein.

What is claimed is:

1. CE device comprising:
at least one processor;
at least one output device configured for being controlled by the processor;
at least one near field communication (NFC) receiver configured to provide input to the processor; and
at least one computer memory comprising instructions executable by the processor to:
receive input signals from the NFC receiver;
retrieve at least one identification (ID) from the signals from the NFC receiver;
compare the ID to at least one test ID, the test ID being an ID of an electronic transaction card (e-card);
responsive to the ID matching the test ID, present a user-perceptible alert on the output device; and
responsive to the ID not matching the test ID, not present the user-perceptible alert on the output device.

2. The CE device of claim 1, wherein the CE device is implemented by a wireless telephone.

3. The CE device of claim 1, wherein the NFC receiver is a radiofrequency identification (RFID) receiver.

4. The CE device of claim 1, wherein the instructions are executable to:
receive at least one test ID, the test ID being a same ID as the ID of the e-card, the e-card being correlated to a customer associated with the CE device.

5. The CE device of claim 4, wherein the test ID is received from a financial institution.

6. The CE device of claim 1, wherein the instructions are executable to:
responsive to receiving the signals from the NFC receiver, transmit a wireless signal to a financial institution indicating reception of the signal from the NFC receiver by the CE device.

7. The memory of claim 1, wherein the instructions are executable to:
send to the bank computer a signal indicating a selection in response to the prompt.

8. Non-transitory computer readable storage medium (NTCRSM) including instructions executable by a processor to:
receive input signals from an NFC receiver, the input signals being from an electronic transaction card (e-card);
retrieve at least one identification (ID) from the signals from the NFC receiver;
compare the ID to at least one test ID, the test ID being an ID of an electronic transaction card (e-card);
responsive to the ID matching the test ID, present a user-perceptible alert on an output device; and
responsive to the ID not matching the test ID, not present the user-perceptible alert.

9. The NTCRSM of claim 8, wherein the CE device is implemented by a wireless telephone.

10. The NTCRSM of claim 8, wherein the instructions are executable to:
receive at least one test ID, the test ID being a same ID as the ID of the e-card, the e-card being correlated to a customer associated with the CE device.

11. The NTCRSM of claim 8, wherein the instructions are executable to:
responsive to receiving the signals from the NFC receiver, transmit a wireless signal to a financial institution indicating reception of the signal from the NFC receiver by the CE device.

12. A method comprising:
receiving input signals from a near field communication (NFC) receiver;
retrieving at least one identification (ID) from the signals from the NFC receiver;
comparing the ID to at least one test ID, the test ID being an ID of an electronic transaction card (e-card);
responsive to the ID matching the test ID, presenting a user-perceptible alert on the output device; and responsive to the ID not matching the test ID, not presenting the user-perceptible alert on the output device.

13. The method of claim 12, comprising:

receiving at least one test ID, the test ID being a same ID as the ID of the e-card, the e-card being correlated to a customer associated with the CE device.

14. The method of claim 13, comprising:

receiving the test ID from a financial institution.

15. The method of claim 12, comprising:

responsive to receiving the signals from the NFC receiver, transmitting a wireless signal to a financial institution indicating reception of the signal from the NFC receiver by the CE device.

\* \* \* \* \*